(12) United States Patent
Kumazawa et al.

(10) Patent No.: US 9,367,225 B2
(45) Date of Patent: Jun. 14, 2016

(54) ELECTRONIC APPARATUS AND COMPUTER-READABLE RECORDING MEDIUM

(71) Applicant: FUJITSU LIMITED, Kawasaki-shi, Kanagawa (JP)

(72) Inventors: Misa Kumazawa, Yokohama (JP); Katsuaki Akama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 116 days.

(21) Appl. No.: 14/229,072

(22) Filed: Mar. 28, 2014

(65) Prior Publication Data

US 2014/0304634 A1    Oct. 9, 2014

(30) Foreign Application Priority Data

Apr. 9, 2013    (JP) .................................. 2013-081651

(51) Int. Cl.
| | | |
|---|---|---|
| *G06F 3/00* | (2006.01) | |
| *G06F 3/0486* | (2013.01) | |
| *G06F 3/0488* | (2013.01) | |
| *G06F 9/54* | (2006.01) | |

(52) U.S. Cl.
CPC ............ *G06F 3/0486* (2013.01); *G06F 3/0488* (2013.01); *G06F 9/543* (2013.01)

(58) Field of Classification Search
CPC .................................................. G06F 3/0486
USPC ........................................................ 715/770
See application file for complete search history.

(56) References Cited

U.S. PATENT DOCUMENTS

| | | | |
|---|---|---|---|
| 6,309,305 B1 | 10/2001 | Kraft | |
| 8,854,324 B2 * | 10/2014 | Mukai | G06F 3/04883 345/173 |
| 2005/0041860 A1 | 2/2005 | Jager | |
| 2006/0143154 A1 | 6/2006 | Jager | |
| 2008/0109744 A1 | 5/2008 | Ozzie et al. | |
| 2013/0021287 A1 * | 1/2013 | Endo | G06F 3/04886 345/173 |
| 2014/0089833 A1 * | 3/2014 | Hwang | G06F 3/04817 715/769 |
| 2014/0289662 A1 * | 9/2014 | Morita | G06F 3/0488 715/769 |

FOREIGN PATENT DOCUMENTS

| | | |
|---|---|---|
| JP | 2000-032155 | 1/2000 |
| JP | 2005-071349 | 3/2005 |
| JP | 2011-209822 | 10/2011 |

OTHER PUBLICATIONS

EESR—Extended European Search Report of EP Patent Application 14162241.5 mailed Jul. 14, 2014.

* cited by examiner

*Primary Examiner* — William Titcomb
(74) *Attorney, Agent, or Firm* — Fujitsu Patent Center (57) ABSTRACT

A mobile terminal device displays at least one category on a predetermined display unit upon reception of copy operation or cut operation with respect to display information which is to be displayed on the predetermined display unit. The mobile terminal device stores the display information which is subjected to the copy operation or the cut operation in the memory, while associating the display information with a category selected out of the at least one category displayed on the predetermined display unit.

6 Claims, 12 Drawing Sheets

| CATEGORY NAME | PASTING CANDIDATES |
|---|---|
| INDIVIDUAL IDENTIFICATION | 1. FJ-12345678<br>2. abc@docodemo.com<br>3. 1234-1234-1234 |
| SPECIAL TERM | 1. HUMAN CENTRIC ENGINE<br>2. TETHERING MONITOR<br>3. SOFT HAND-OFF<br>4. CONGESTION CONTROL |
| FOREIGN CHARACTER STRING | 1. Café du Pari |
| PLACE NAME | 1. MUTSUURA<br>2. OTOINEPPU |

FIG.4

| CATEGORY NAME | COPY ICON DISPLAY POSITION |
|---|---|
| INDIVIDUAL IDENTIFICATION | (X11,Y11)-(X12,Y12) |
| SPECIAL TERM | (X21,Y11)-(X22,Y12) |
| FOREIGN CHARACTER STRING | (X11,Y31)-(X12,Y32) |
| PLACE NAME | (X21,Y31)-(X22,Y32) |

```
(1) CATEGORY NAME: INDIVIDUAL IDENTIFICATION
   | (PASTING CANDIDATES) FJ-12345678
   | (PASTING CANDIDATES) abc@docodemo.com
   | (PASTING CANDIDATES) 1234-1234-1234

(2) CATEGORY NAME: SPECIAL TERM
   | (PASTING CANDIDATES) HUMAN CENTRIC ENGINE
   | (PASTING CANDIDATES) TETHERING MONITOR
   | (PASTING CANDIDATES) SOFT HAND-OFF
   | (PASTING CANDIDATES) CONGESTION CONTROL (3) CATEGORY NAME: FOREIGN CHARACTER STRING
   | (PASTING CANDIDATES) Café du Pari (4) CATEGORY NAME: PLACE NAME
   | (PASTING CANDIDATES) MUTSUURA
   | (PASTING CANDIDATES) OTOINEPPU
```

ELECTRONIC APPARATUS AND COMPUTER-READABLE RECORDING MEDIUM

CROSS-REFERENCE TO RELATED APPLICATION

This application is based upon and claims the benefit of priority of the prior Japanese Patent Application No. 2013-081651, filed on Apr. 9, 2013, the entire contents of which are incorporated herein by reference.

FIELD

The embodiments discussed herein are related to an electronic apparatus and a copy control program.

BACKGROUND

In electronic apparatuses, such as personal computers, portable telephones, and smartphone, copy and paste and/or cut and paste functions have conventionally been used. Moreover, in the electronic apparatuses having a touch panel, the copy and paste and/or cut and paste functions are executed upon reception of copy and/or paste operation on the touch panel.

In a recent years, there is known a technology that stores a plurality of character strings or the like in a clipboard, receives selection of a character string at the time of pasting, and pastes the selected character string at a specified position. For example, at the time of copying or cutting, upon reception of copy or cut operation with respect to a character string, an image, or the like in Web pages and the like, the electronic apparatus copies or cuts the character string or the like, and stores it in a clipboard. At the time of pasting, upon reception of paste operation, the electronic apparatus displays copied or cut character strings which are stored in the clipboard and receives selection of a character string or the like as a paste target. The electronic apparatus then pastes the selected character string or the like at a specified position.

Patent Literature 1: Japanese Laid-open Patent Publication No. 2011-209822

Patent Literature 2: Japanese Laid-open Patent Publication No. 2005-71349

Patent Literature 3: Japanese Laid-open Patent Publication No. 2000-32155

However, in the aforementioned technology, when a large number of character strings or the like are stored in the clipboard, a character string or the like as a paste target is searched from a large number of the character strings in the clipboard. Therefore, the operability of paste operation has room for improvement. Accordingly, it can be considered to store categorized character strings or the like in the clipboard and to select a category at the time of paste operation so as to narrow down paste candidates to be displayed. However, this approach disadvantageously generates an operation of category specification at the time of storing.

SUMMARY

According to an aspect of the embodiment, an electronic apparatus includes a memory; and a processor that is connected to the memory, wherein the processor executes a process. The process includes displaying at least one category on a predetermined display unit, upon reception of copy operation or cut operation with respect to display information which is to be displayed on the predetermined display unit; and storing the display information which is subjected to the copy operation or the cut operation in the memory while associating the display information with a category selected out of the at least one category displayed on the predetermined display unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The present invention is not limited to these embodiments. The following embodiments may properly be combined without causing inconsistency.

[a] First Embodiment

Description of Mobile Terminal Device

Figure 1:
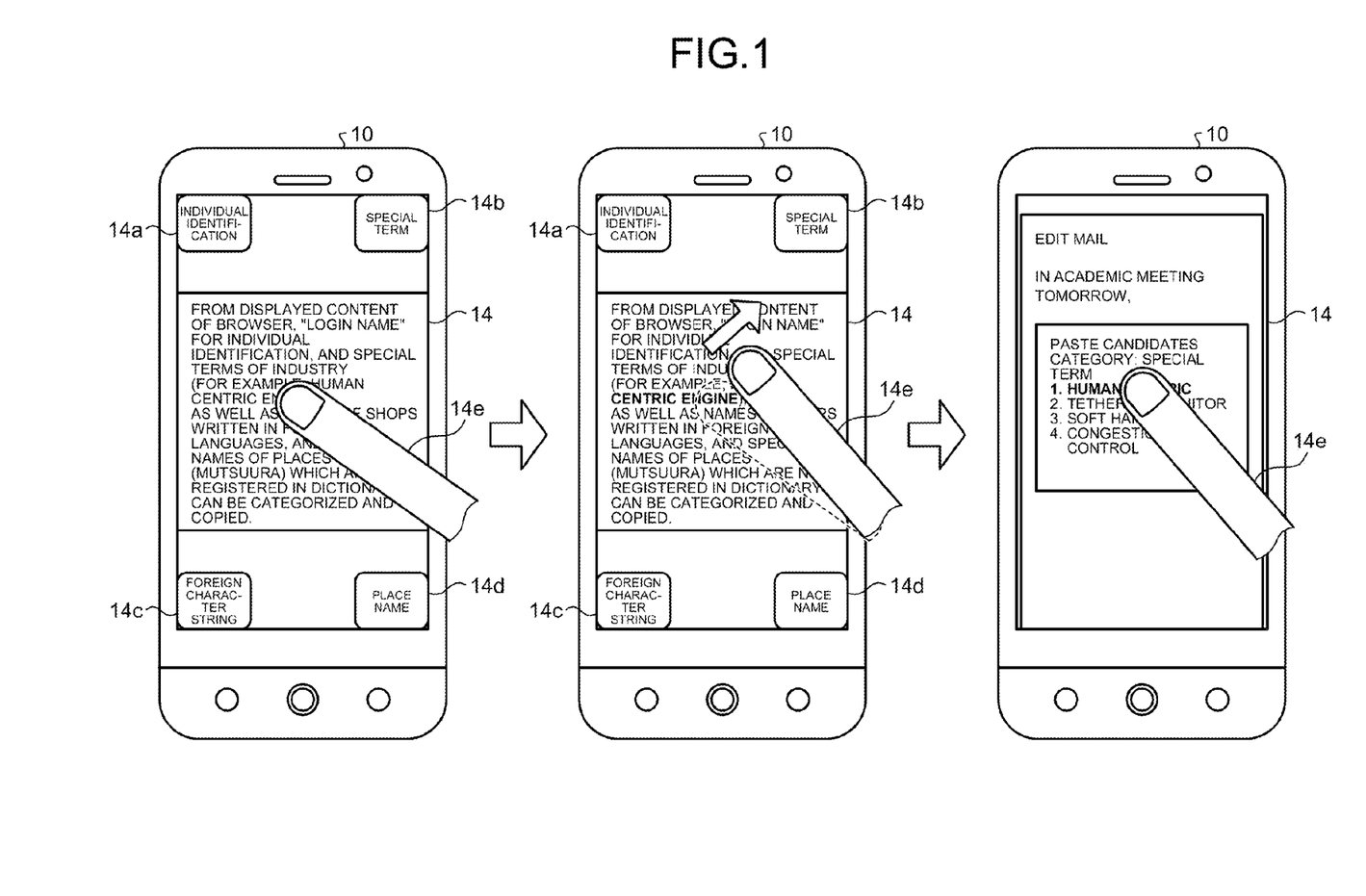
FIG. 1 is an explanatory view illustrating a mobile terminal device according to a first embodiment.

FIG. 1 is an explanatory view illustrating a mobile terminal device according to a first embodiment. A mobile terminal device 10 illustrated in FIG. 1 is an example of an electronic apparatus, such as smartphones, tablet terminal devices, mobile phones, and personal computers. In this description, a smartphone with a touch panel is taken as an example of the mobile terminal device 10.

Although a copy and paste function will be described as an example, the present invention is not limited to this function. The same processing may be performed when a cut and paste function is applied. Although an example of copying and pasting a character string is described, the present invention is not limited thereto. Images, moving images, drawings and the like may also be copied and pasted in the similar manner.

When copy operation, such as long tap on a touch panel, is detected on a display unit 14 used as a touch panel, the mobile terminal device 10 displays categories on the display unit 14. For example, when a character string "human centric engine" is selected by a user 14e as a copy target as illustrated in FIG. 1, the mobile terminal device 10 displays icons of respective categories. More specifically, the mobile terminal device 10 displays an individual identification icon 14a, a special term icon 14b, a foreign character string icon 14c, and a place name icon 14d on the display unit 14.

Next, the mobile terminal device 10 stores the character string which was subjected to copy operation, in a memory region which is associated with a category selected out of the categories on display. For example, as illustrated in FIG. 1, when the user 14e performs flick operation of a character string "human centric engine" toward the special term icon 14b, the mobile terminal device 10 stores the "human centric engine" in a memory region corresponding to the special term icon 14b.

Therefore, since the mobile terminal device 10 which retains a plurality of character strings in clipboards stores a character string in a clipboard which corresponds to the category selected by the user at the time of copying. This enables the user to easily select a character string by category at the time of pasting.

For example, as illustrated in FIG. 1, upon reception of paste operation on the display unit 14, the mobile terminal device 10 displays each category on the display unit 14. The mobile terminal device 10 then displays on the display unit 14 copied character strings, which were stored while being associated with the special term icon 14b, out of the categories displayed on the display unit 14. Then, the mobile terminal device 10 pastes the character string "human centric engine", which was selected out of the copied character strings on display, at a specified position.

Configuration of Mobile Terminal Device

Figure 2:
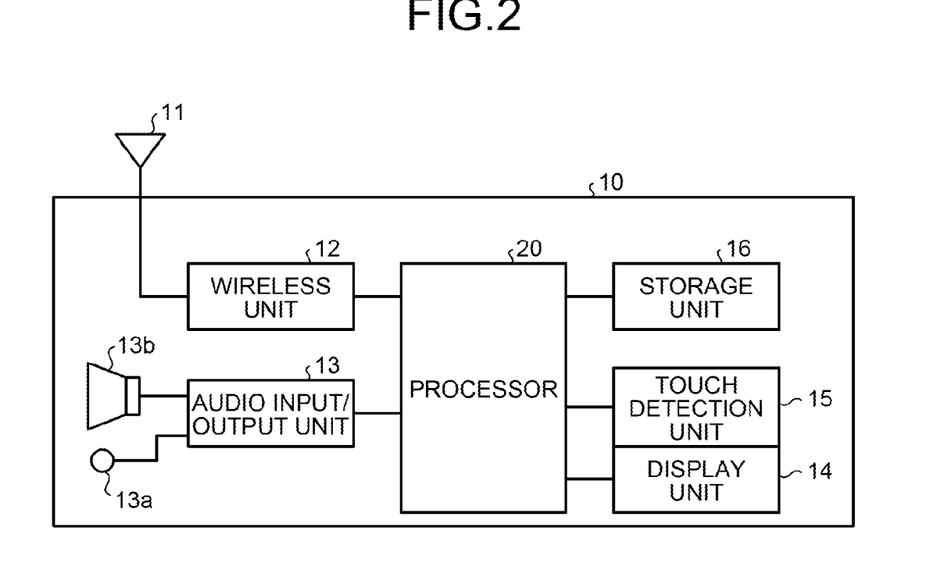
FIG. 2 is a block diagram illustrating the configuration of a mobile terminal device according to the first embodiment.

FIG. 2 is a block diagram illustrating the configuration of the mobile terminal device according to the first embodiment. As illustrated in FIG. 2, the mobile terminal device 10 has an antenna 11, a wireless unit 12, an audio input/output unit 13, the display unit 14, a touch detection unit 15, a storage unit 16, and a processor 20. The hardware configuration illustrated in FIG. 2 is merely an example, and other hardware, such as a short-distance radio unit, may be included therein.

The antenna 11 is an example of a transmitter-receiver that transmits and receives radio signals of various data and the like. The wireless unit 12 is an example of a communication central processing unit (CCPU) or the like that executes wireless communication via the antenna 11. For example, the wireless unit 12 receives a signal via the antenna 11 and outputs the reception signal to the processor 20. The wireless unit 12 also transmits a signal generated by the processor 20 via the antenna 11. For example, the wireless unit 12 transmits and receives signals, such as speech voice and receiver voice of a user, when the mobile terminal device 10 is a portable telephone that enables telephone call.

The audio input/output unit 13 is an example of an input/output interface that executes voice collection and voice output. For example, the audio input/output unit 13 applies audio processing to the voice collected with a microphone 13a, and also applies audio processing to a voice signal in a radio signal received through the wireless unit 12. The audio input/output unit 13 outputs these audio-processed sounds from a speaker 13b.

The display unit 14 is an example of a display and/or a touch panel that displays a variety of information. For example, the display unit 14 displays an operation screen of an application executed by the processor 20, and/or transmission and reception information. The touch detection unit 15 is an example of an interface that detects the information operated on the display unit 14. More specifically, the touch detection unit 15 detects the information operated by the user on the display unit 14, and outputs the detected information to the processor 20. For example, the touch detection unit 15 detects change in electrostatic capacitance caused by a touch on the display unit 14 to identify a touched position.

The storage unit 16 is a storage device that stores data for executing various functions of the mobile terminal device 10 and/or various programs for executing the various functions of the mobile terminal device 10. Examples of the storage unit 16 include a read only memory (ROM), a random access memory (RAM), and a hard disk.

The storage unit 16 has a storage region for each category. For example, the storage unit 16 may have clipboards divided by category and may have one clipboard segmented for each category. Here, a description is given of an example in which the storage unit 16 has clipboards divided by category. Note that the storage unit 16 has a copy buffer that temporarily stores a copied character string.

Figure 3:
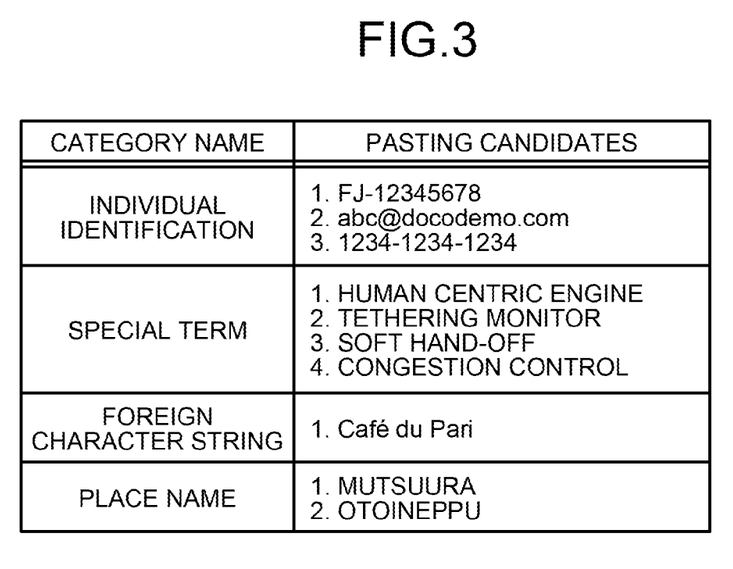
FIG. 3 illustrates an example of clipboards stored in the mobile terminal device according to the first embodiment.

FIG. 3 illustrates an example of clipboards stored in the mobile terminal device according to the first embodiment. As illustrated in FIG. 3, the storage unit 16 stores clipboards with category names of "individual identification," "special term," "foreign character string," and "place name." The category names to be stored in this case may arbitrarily be set by the user. Moreover, each category stores "pasting candidates" that are copied information.

In the example of FIG. 3, the storage unit 16 stores "1. FJ-12345678," "2. abc@docodemo.com," and "3. 1234-1234-1234" in association with the category name "individual identification." The storage unit 16 also stores "1. human centric engine," "2. tethering monitor," "3. soft handoff," and "4. congestion control" in association with the category name "special term." The storage unit 16 also stores "1. Café du Pari" in association with the category name "foreign character string." The storage unit 16 also stores "1. Mutsuura" and "2. Otoineppu" in association with the category name "place name." Note that numeric characters, such as "1" illustrated herein, are item numbers automatically assigned in the order of being copied and/or in descending order of the frequency of being pasted.

Figure 4:
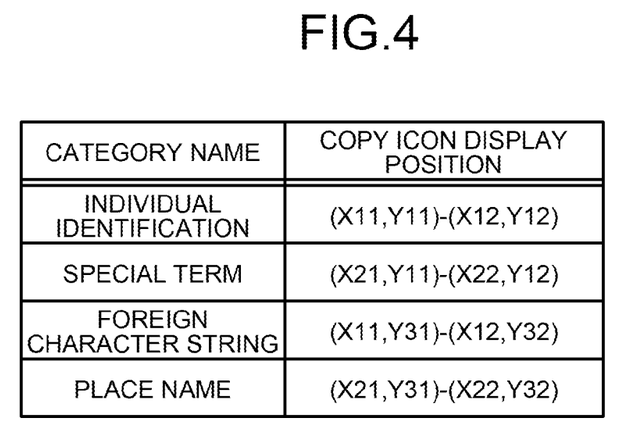
FIG. 4 illustrates an example of icon display regions stored in the mobile terminal device according to the first embodiment.

The storage unit 16 stores regions for displaying the category icons. FIG. 4 illustrates an example of icon display regions stored in the mobile terminal device according to the first embodiment. As illustrated in FIG. 4, the storage unit 16 stores "category names" in association with "copy icon display positions." The "category names" stored in this case are category names corresponding to FIG. 3. The "copy icon display positions" are coordinate information which identifies the regions where the icons are displayed.

In the example of FIG. 4, it is indicated that the "individual identification" icon is displayed in a region of "(X11, Y11)-(X12,Y12)." It is also indicated that the "special term" icon is displayed in a region of "(X21, Y11)-(X22, Y12)." It is also indicated that the "foreign character string" icon is displayed in a region of "(X11, Y31)-(X12, Y32)." It is also indicated that the "place name" icon is displayed in a region of "(X21, Y31)-(X22, Y32)."

Note that the copy icon display positions described herein are coordinates with a predetermined center of the display unit 14 being defined as reference "0, 0" and that the settings thereof may arbitrarily be changed. Moreover, without being limited to the coordinate information, the copy icon display positions may be any kind of information as long as the information can be used to identify positions on the touch panel.

Referring back to FIG. 2, the processor 20 controls the entire mobile terminal device 10 with use of the programs and data which are stored in a ROM and/or a RAM included in the storage unit 16. Examples of the processor 20 include a central processing unit (CPU) and a micro processing unit (MPU).

The processor 20 expands a program, which is stored in the ROM and the like, in the RAM and executes various processes corresponding to various processing. For example, when the touch detection unit 15 receives operational input by a touch of the user, the processor 20 executes processing corresponding to the operational input, and displays an execution result on the display unit 14.

Copy Processing

Now, copy processing will be described in detail. For example, when copy operation is detected in the touch detection unit 15, the processor 20 refers to the storage unit 16 to identify categories and display positions, and displays icons of the respective categories at respective display positions identified on the display unit 14. The processor 20 then receives selection of an icon that is to be a copy destination in the display unit 14. Then, once the touch detection unit 15 receives the selection of the icon as a copy destination, the processor 20 stores a copied character string or the like in a region of the storage unit 16 that corresponds to the selected icon.

In one example, when "human centric engine" is copied, the processor 20 displays each icon of "the individual identification, the special term, the foreign character string, and the place name" on the touch panel. When the user performs flick operation of "human centric engine," the processor 20 temporarily stores the flicked "human centric engine" in the copy buffer of the storage unit 16. Then, the processor 20 identifies that an icon present in a flicked direction is the "special term" icon. The processor 20 then stores the "human centric engine," which was stored in the copy buffer, in the "pasting candidates" of a clipboard which is associated with the "special term" out of the clipboards included in the storage unit 16.

The storage location can be selected not only by flick operation. For example, a combination of "copy operation+ storage location selection operation+storing operation," which is used in general personal computers, may also achieve similar processing. For example, such operation as selecting the category of a storage location with a touch panel or a mouse after execution of copy operation may also achieve similar processing.

Paste Processing

Next, paste processing will be described in detail. When paste operation is detected by the touch detection unit 15, the processor 20 refers to the storage unit 16 to identify the categories and the display positions and displays icons of the respective categories at respective display positions identified on the display unit 14. The processor 20 then receives selection of an icon in which a character string to be pasted is stored. Then, once the touch detection unit 15 receives selection of the icon, the processor 20 displays on the display unit 14 a copied character string which is associated with the category of the selected icon. The processor 20 then pastes the character string, which was selected out of the copied character strings on display, at a position specified by the user.

In one example, upon reception of paste operation such as long tap on the touch panel, the processor 20 displays each icon of "the individual identification, the special term, the foreign character string, and the place name" on the touch panel. The processor 20 then receives selection of the icon "place name" from the user. As a consequence, the processor 20 displays on the touch panel "1. Mutsuura, 2. Otoineppu" which are stored in the "pasting candidates" in a clipboard corresponding to the "place name." Then, if the user selects "1. Mutsuura," the processor 20 pastes "Mutsuura" at a position specified by the user.

Copy Processing Flow

Figure 5:
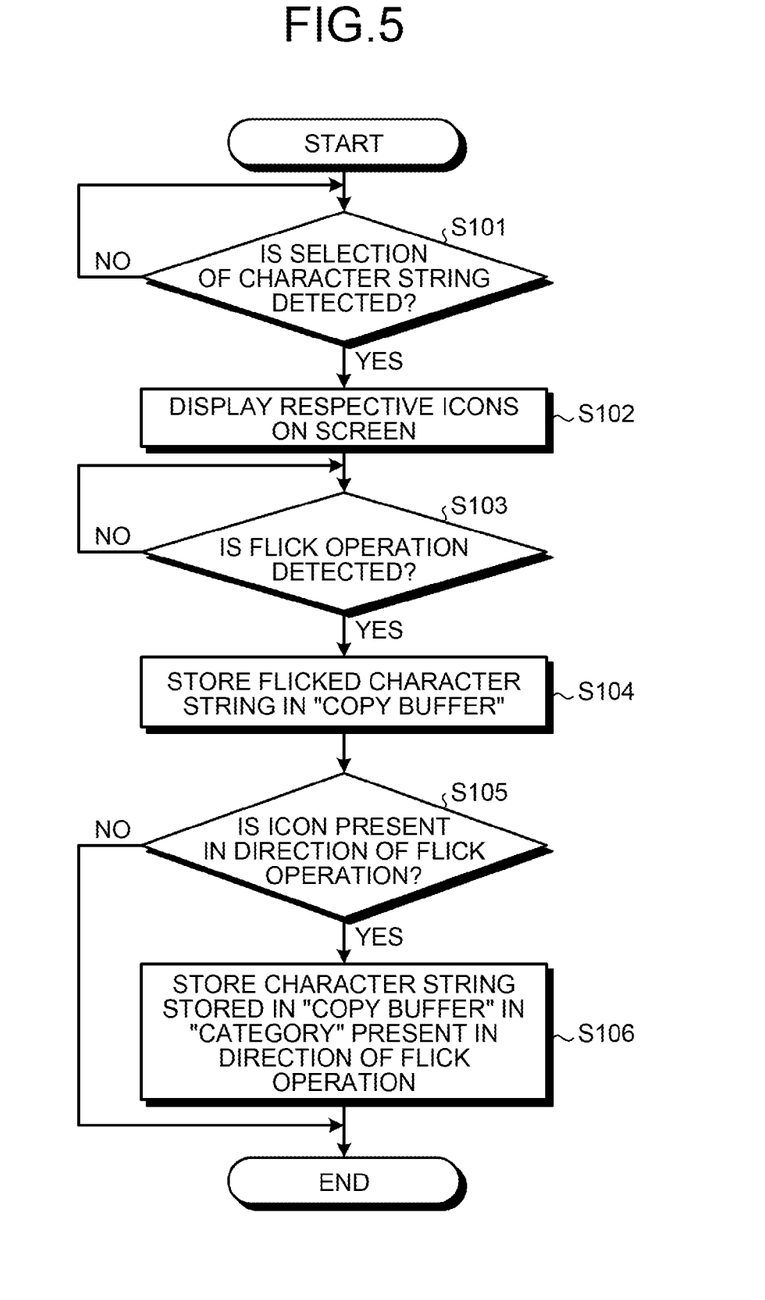
FIG. 5 is a flow chart illustrating the flow of copy processing executed by the mobile terminal device according to the first embodiment.

FIG. 5 is a flow chart illustrating the flow of copy processing executed by the mobile terminal device according to the first embodiment. As illustrated in FIG. 5, when selection of a character string is detected by the touch detection unit 15 (Step S101: Yes), the processor 20 in the mobile terminal device 10 displays the icons of respective categories stored in the storage unit 16 at respective positions specified on the display unit 14 (Step S102).

Then, when flick operation is detected via the touch detection unit 15 (Step S103: Yes), the processor 20 stores a flicked character string or the like in the copy buffer of the storage unit 16 (Step S104).

Next, the processor 20 determines whether or not an icon is present in a flicked direction on the display unit 14 (Step S105). If it is determined that the icon is present in the flicked direction (Step S105: Yes), the processor 20 stores the character string stored in the copy buffer, in the "pasting candidates" in a clipboard which is associated with the category identified by the icon (Step S106).

If it is determined that the icon is not present in the flicked direction (Step S105: No), the processor 20 ends the processing, without storing the character string stored in the copy buffer in any one of the clipboards.

Paste Processing Flow

Figure 6:
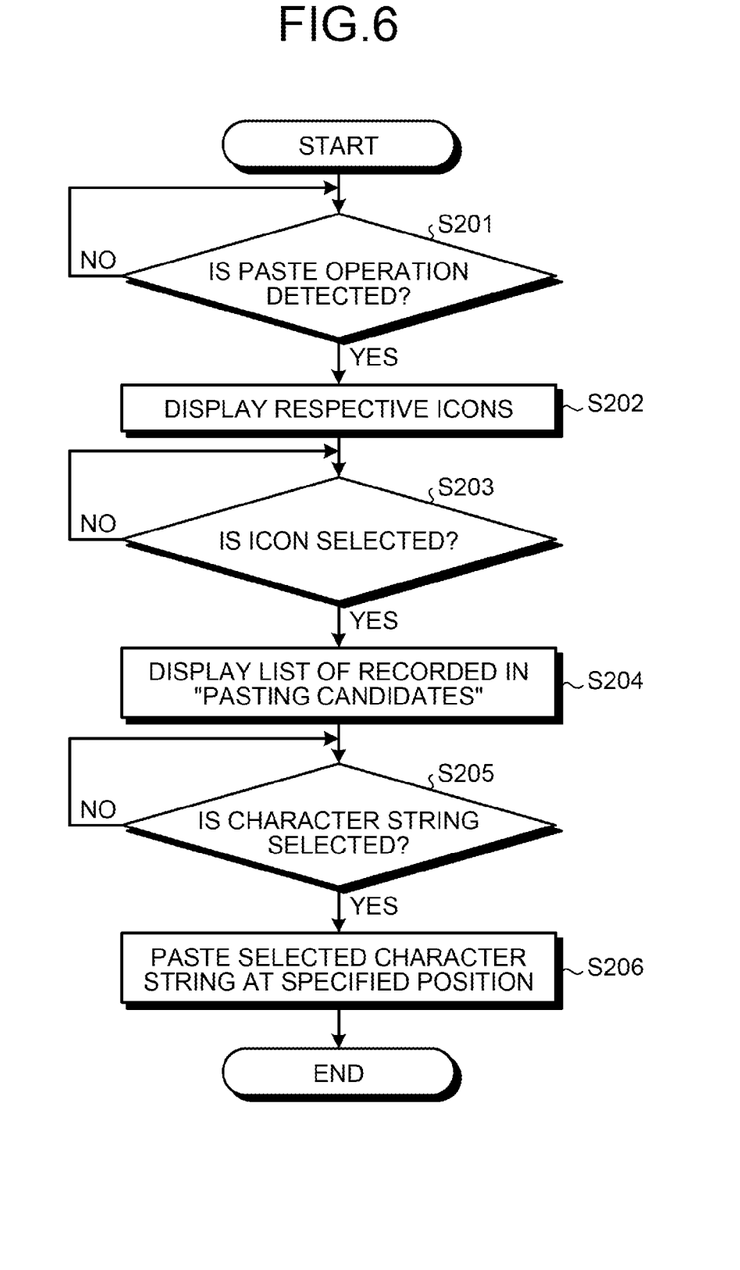
FIG. 6 is a flow chart illustrating the flow of paste processing executed by the mobile terminal device according to the first embodiment.

FIG. 6 is a flow chart illustrating the flow of paste processing executed by the mobile terminal device according to the first embodiment. As illustrated in FIG. 6, when paste operation is detected by the touch detection unit 15 (Step S201: Yes), the processor 20 in the mobile terminal device 10 displays the icons of respective categories stored in the storage unit 16 at respective positions specified on the display unit 14 (Step S202).

Next, when selection of a category icon is detected by the touch detection unit 15 (Step S203: Yes), the processor 20 displays a list of the "pasting candidates" in a clipboard corresponding to the selected category on the display unit 14 (Step S204).

Then, once the touch detection unit 15 receives selection of a character string from the list of the "pasting candidates" on display (Step S205: Yes), the processor 20 pastes the selected character string at a position specified by the user (Step S206).

Effect

Thus, the mobile terminal device 10 according to the first embodiment stores a copied character string in a clipboard corresponding to the category selected by the user at the time of copying and displays the categories at the time of pasting so as to enable the user to select a character string that is a paste target.

Therefore, the mobile terminal device 10 can categorize character strings that are copy targets at the time of copying and enable the user to select a category at the time of pasting to perform paste operation. This makes it possible to improve the operability at the time of pasting a copied or cut character string and the like.

For example, the categories and copied character strings may be stored in one clipboard while being associated with each other. However, in this approach, multiple associations between the categories and character strings are displayed at the time of pasting. As a result, the user needs time and effort to search for a character string to paste. This tendency is particularly notable when the categories are subdivided, and/or copied character strings are huge in quantity.

As compared with this, the mobile terminal device 10 can store, at the time of copying, a copied character string selected by the user in a clipboard generated by the user for each category. The mobile terminal device 10 can also display, at the time of pasting, copied character strings which are associated with the category selected by the user. Therefore, the user can easily select a character string through the category at the time of pasting.

[b] Second Embodiment

In the first embodiment, there has been described an example in which the mobile terminal device 10 displays on the touch panel the respective categories registered as a storage location of a copy. However, the present invention is not limited to this example. For example, the mobile terminal device 10 can select a category to display, based on the character string or the like that is selected as a copy target.

Accordingly, in the second embodiment, an example will be described in which the mobile terminal device 10 selects and displays a category on the display unit 14 based on the character string selected as a copy target. In the following, a flow and specific example of the processing according to the second embodiment will be described.

Processing Flow

Figure 7:
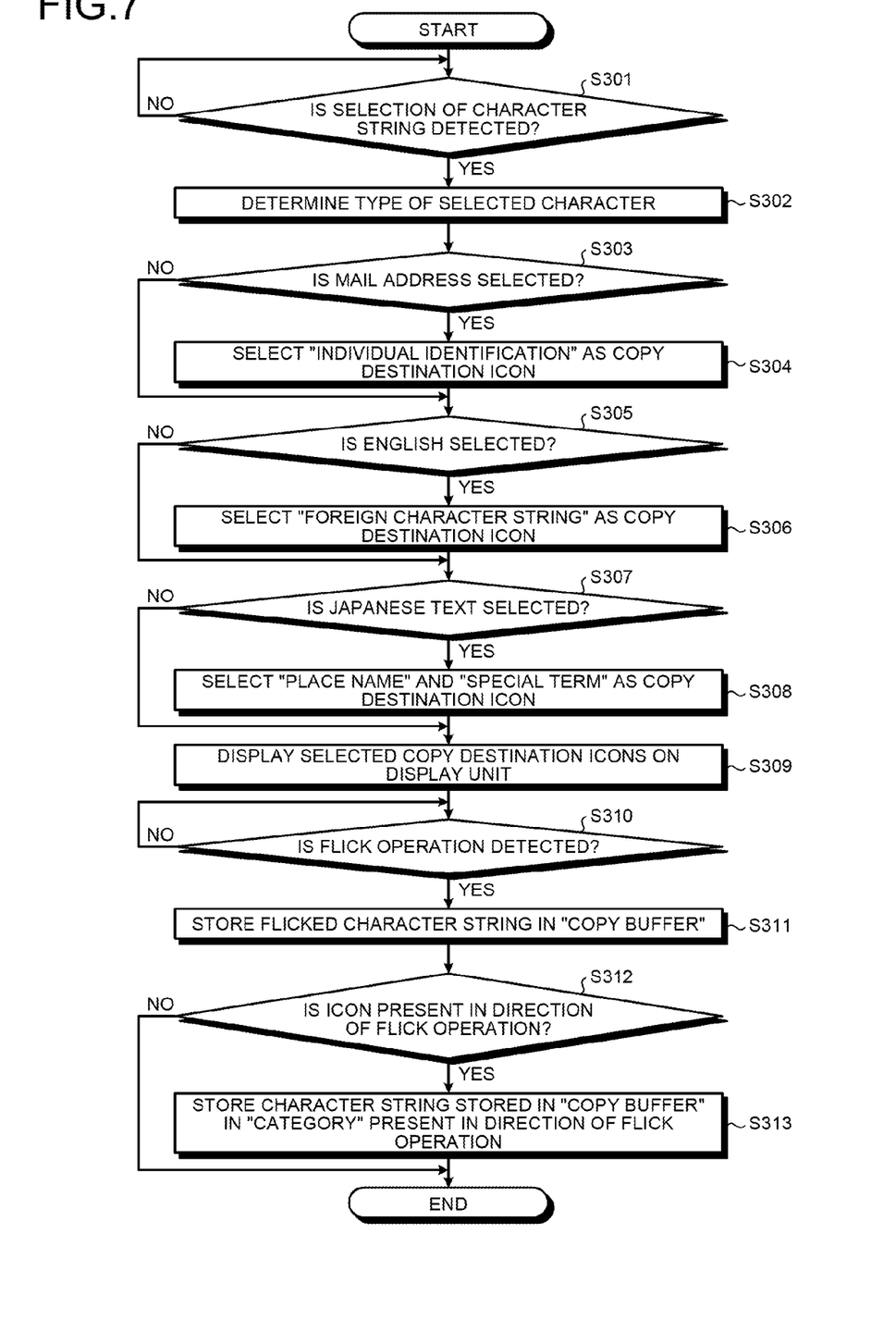
FIG. 7 is a flow chart illustrating the flow of category selection processing executed by a mobile terminal device according to a second embodiment.

FIG. 7 is a flow chart illustrating the flow of category selection processing executed by the mobile terminal device according to the second embodiment. As illustrated in FIG. 7, once selection of a character string is started by the touch detection unit 15 (Step S301: Yes), the processor 20 in the mobile terminal device 10 determines a type of a selected character string or the like (Step S302).

For example, the processor 20 can identify the type of the selected character string by referring to a dictionary and the like which are generally included in the mobile phone and the like to make comparison with the selected character string. As another approach, the processor 20 may apply morphological analysis and the like on the selected character string to perform general character recognition and the like, so that the type of the character string is identified. As still another approach, the processor 20 can also identify the type of the selected character string to be a mail address if a symbol "@" is present in the selected character string.

When the selected object is an image or the like, the processor 20 can extract a title of the image from information such as metadata, a profile, and a header of the image, and determine the type based on the obtained title. As yet another approach, the processor 20 can also identify the type based on a place and/or a situation where the selected image or the like was taken and further based on characteristics and the like which are extracted by image analysis.

Note that the processor 20 preinstalls the information indicating association between the types and the categories in the storage unit 16. For example, the storage unit 16 stores association between "types and category names," such as "mail addresses and the individual identification," "English and the foreign character string," "Japanese texts and the place name," and "Japanese texts and the special term."

If it is determined that the mail address is selected (Step S303: Yes), the processor 20 refers to the storage unit 16 to select the "individual identification" icon 14a as a copy destination icon (Step S304). In other words, when it is determined that the type of the selected character string is a mail address, the processor 20 selects the "individual identification" icon 14a as a copy destination icon. When it is determined that the type of the selected character string is not a mail address (Step S303: No), the processor 20 executes Step S305, without executing Step S304.

Next, if it is determined that English is selected (Step S305: Yes), the processor 20 refers to the storage unit 16 to select the "foreign character string" icon 14c as a copy destination icon (Step S306). In other words, when it is determined that the type of the selected character string is English, the processor 20 selects the "foreign character string" icon 14c as a copy destination icon. When it is determined that the type of the selected character string is not English (Step S305: No), the processor 20 executes Step S307, without executing Step S306.

Next, if it is determined that a Japanese text is selected (Step S307: Yes) in the same manner, the processor 20 refers to the storage unit 16 to select the "place name" icon 14d and the "special term" icon 14b as a copy destination icon (Step S308). In other words, when it is determined that the type of the selected character string is a Japanese text, the processor 20 selects the "place name" icon 14d and the "special term" icon 14b as a copy destination icon. When it is determined that the type of the selected character string is not a Japanese text (Step S307: No), the processor 20 executes Step S309, without executing Step S308.

Then, the processor 20 refers to the storage unit 16 to identify the display position of the copy destination icon selected in Step S303 to Step S308, and displays the icon at each position identified on the display unit 14 (Step S309). Since each processing of Step S310 to Step S313 and onward is similar to each processing of Step S103 to Step S106, a detailed description thereof is omitted.

Specific Example

Figure 8:
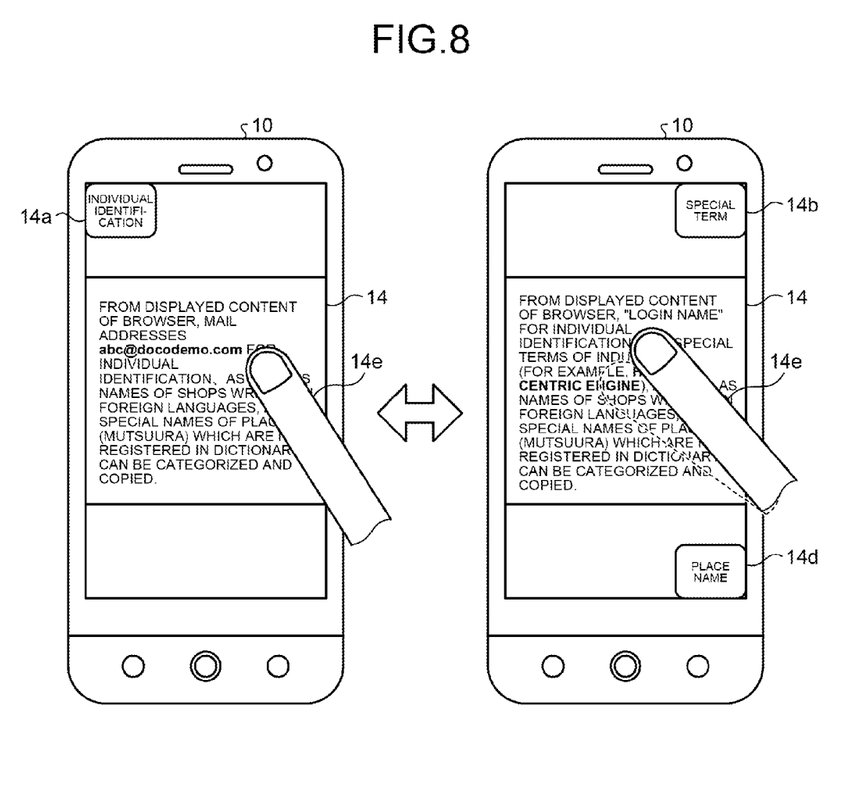
FIG. 8 is an explanatory view illustrating the mobile terminal device according to the second embodiment.

FIG. 8 is an explanatory view illustrating the mobile terminal device according to the second embodiment. As illustrated on the left side of FIG. 8, when it is detected that the user 14e has copied "abc@docodemo.com" in a document displayed on the display unit 14 that is a touch panel, the mobile terminal device 10 determines the type of "abc@docodemo.com" to be a mail address. Accordingly, the mobile terminal device 10 displays the icon 14a of "individual identification" corresponding to the type "mail address" at a specified position on the display unit 14.

As illustrated on the right side of FIG. 8, the mobile terminal device 10 also detects that the user 14e has copied "human centric engine" in a document displayed on the display unit 14 that is a touch panel. In this case, the mobile terminal device 10 determines the type of "human centric engine" to be a Japanese text. Accordingly, the mobile terminal device 10 displays the "place name" icon 14d and the "special term" icon 14b corresponding to the type "Japanese text" at the specified positions on the display unit 14.

Effect

Thus, the mobile terminal device 10 according to the second embodiment can select the category of the storage location corresponding to a copied character string or the like. Consequently, even when the user sets a plurality of categories, it becomes possible to display some categories assumed as a storage location candidate. As a result, it becomes possible to assist the user to select a category, so that user-friendliness can be enhanced.

[c] Third Embodiment

While the example in which the mobile terminal device 10 selects a category based on the type of a character string or the like that is a copy target has been described in the second embodiment, the present invention is not limited to the embodiment disclosed. For example, the mobile terminal device 10 can select, as a category to display, a category in which character strings similar to the character string selected as a copy target are registered.

Accordingly, in the third embodiment, an example will be described in which the mobile terminal device 10 selects and displays a category, in which character strings similar to the character string selected as a copy target are registered, on the display unit 14. Hereinafter, a flow and specific example of the processing according to the third embodiment will be described.

Processing Flow

Figure 9:
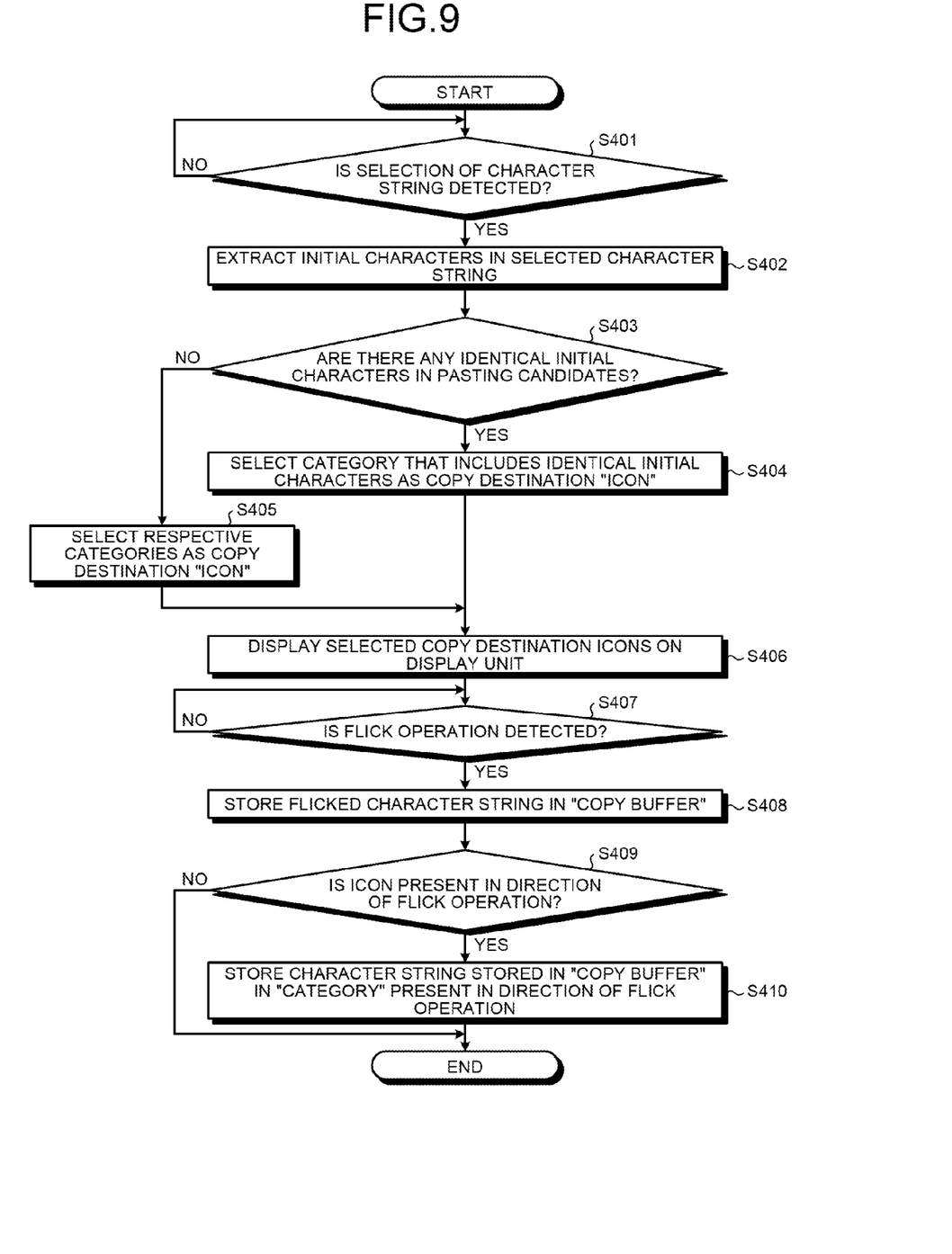
FIG. 9 is a flow chart illustrating the flow of category selection processing executed by a mobile terminal device according to a third embodiment.

FIG. 9 is a flow chart illustrating the flow of category selection processing executed by a mobile terminal device according to a third embodiment. As illustrated in FIG. 9, when selection of a character string is detected by the touch detection unit 15 (Step S401: Yes), the processor 20 in the mobile terminal device 10 extracts initial characters in a selected character string (Step S402).

For example, the processor 20 may extract initial four characters in the selected character string, and/or may extract a portion from an initial character up to a delimiter, such as a "black dot (•)," "slash (/)," "under bar (_)" and "period (.)."

Next, the processor 20 refers to the "pasting candidates" in the clipboards of the respective categories included in the storage unit 16 and determines whether or not there are any initial characters identical to the extracted initial characters (Step S403). Although in this example, the processor 20 determines whether or not there are any initial characters identical to the extracted initial characters, the present invention is not limited to this example. The processor 20 may also determine whether or not there is any character string that includes a character string identical to the extracted initial characters.

If any initial characters identical to the extracted initial letters are detected (Step S403: Yes), the processor 20 selects a category corresponding to the clipboard where the detected character string is stored, as a copy destination icon (Step S404). On the contrary, if the initial characters identical to the extracted initial characters are not detected (Step S403: No), the processor 20 selects the respective categories corresponding to the respective clipboards included in the storage unit 16 as a copy destination icon (Step S405).

Then, the processor 20 refers to the storage unit 16 to identify the display position of the copy destination icon selected in Step S404 or Step S405, and displays the icon at a position identified on the display unit 14 (Step S406). Since each processing of Step S407 to Step S410 and onward is similar to each processing of Step S103 to Step S106, a detailed description thereof is omitted.

Specific Example

Figure 10:
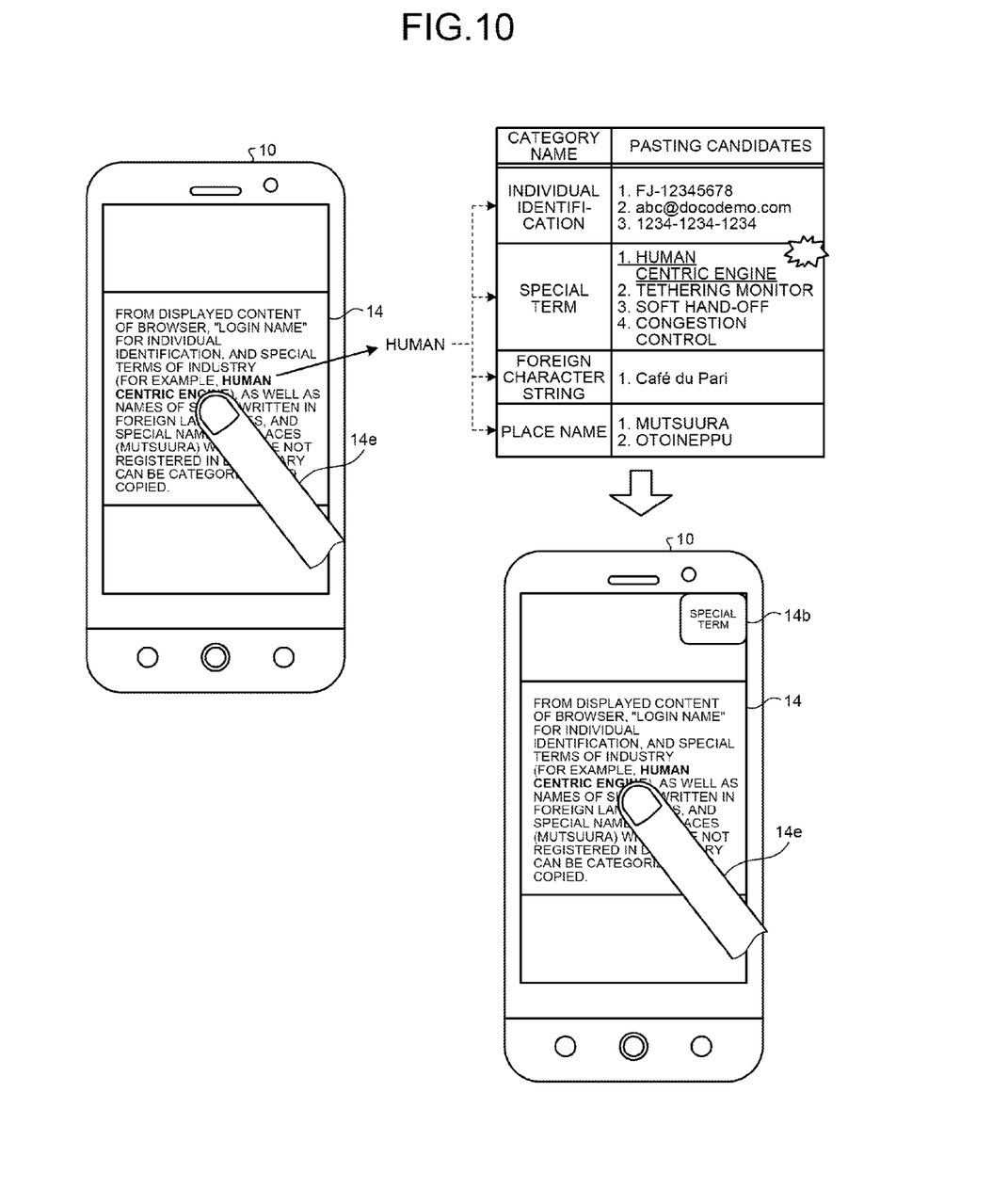
FIG. 10 is an explanatory view illustrating the mobile terminal device according to the third embodiment.

FIG. 10 is an explanatory view illustrating the mobile terminal device according to the third embodiment. As illustrated in FIG. 10, when it is detected that the user 14e has copied the "human error" in the document displayed on the display unit 14 that is a touch panel, the mobile terminal device 10 extracts initial five characters "human" from "human error."

Next, the mobile terminal device 10 refers to the "pasting candidates" of the respective clipboards and determines whether or not there is any candidate that matches with the extracted characters "human." In this case, the mobile terminal device 10 detects "human centric engine" in the category name "special term" as a character string including the identical characters.

Then, the mobile terminal device 10 displays the "special term" icon 14b into which the detected "human centric engine" is registered, at a specified position on the display unit 14.

The mobile terminal device 10 can determine similarity between character strings not only by using the approach involving determination of whether or not there is any identical character string as described in the foregoing but also by using other various approaches. For example, the mobile terminal device 10 may use numerical values such as a Loewenstein distance and a Jalo-Winkler distance.

Moreover, when an image and the like are copied, the mobile terminal device 10 can extract the title of the image from information such as metadata, a profile and a header of the image, and can search for "pasting candidates" which include a character string similar to the title. As another approach, the processor 20 can also search for "pasting candidates" which have a place and/or a situation where the selected image or the like was taken and which further have characteristics and the like extracted by image analysis.

Effect

Thus, the mobile terminal device 10 according to the third embodiment can select and display the category in which character strings and the like similar to a copied character string or the like have already been registered. This makes it possible to easily store similar words in the identical categories. As a result, at the time of pasting, the user can easily search for similar words, so that the operability at the time of pasting is improved.

[d] Fourth Embodiment

Although the examples in which the mobile terminal device 10 displays the icons in the specified regions have been described in the first to third embodiments, the present invention is not limited thereto. For example, the mobile terminal device 10 can display the respective category icons around a character string selected as a copy target. Accordingly, in a fourth embodiment, display examples of the icons will be described.

Figure 11:
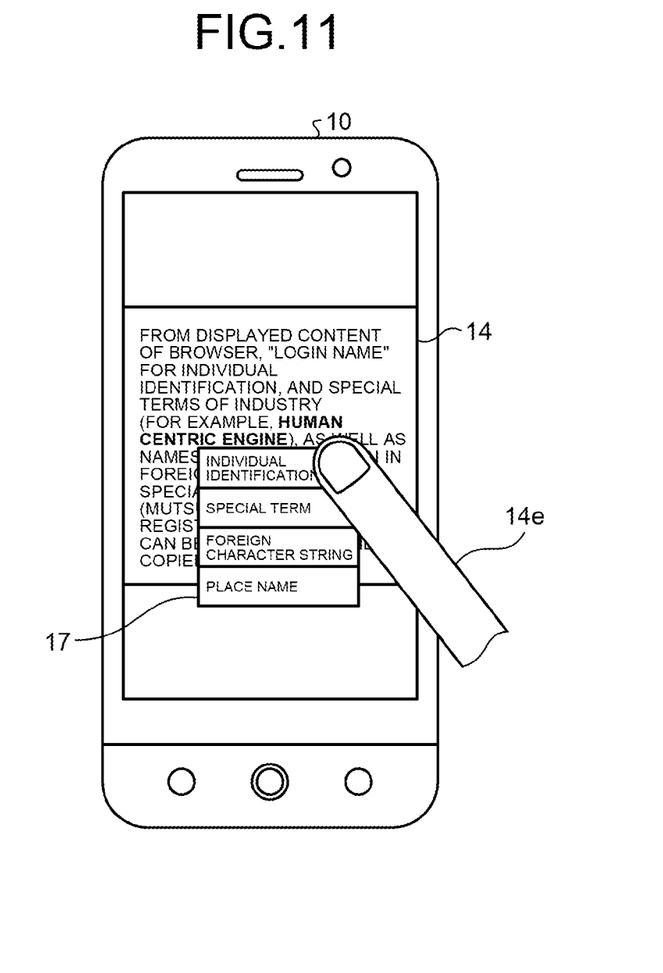
FIG. 11 is an explanatory view illustrating an icon display example 1 in a mobile terminal device according to a fourth embodiment.

FIG. 11 is an explanatory view illustrating an icon display example 1 in a mobile terminal device according to the fourth embodiment. When it is detected that the user 14e has selected a character string "human centric engine" as illustrated in FIG. 11, the processor 20 of the mobile terminal device 10 displays a category list 17 under the selected character string. As a result, a distance of flick operation is shortened, so that operation mistakes and the like can be suppressed.

Figure 12:
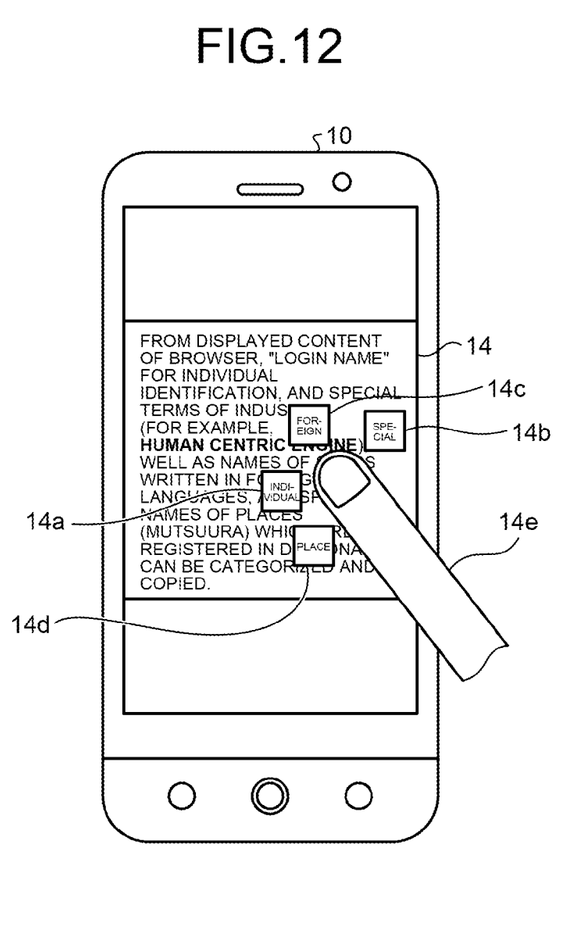
FIG. 12 is an explanatory view illustrating an icon display example 2 in the mobile terminal device according to the fourth embodiment.

FIG. 12 is an explanatory view illustrating an icon display example 2 in the mobile terminal device according to the fourth embodiment. When it is detected that the user 14e has selected a character string "human centric engine" as illustrated in FIG. 12, the processor 20 of the mobile terminal device 10 displays, around the selected character string, icons that display initial characters of the respective category names. As a result, a distance of flick operation is shortened, so that operation mistakes and the like can be suppressed.

[e] Fifth Embodiment

While the embodiments of the present invention have been described in the foregoing, the present invention may be performed in various modes different from the embodiments disclosed. Accordingly, the different embodiments are described hereinbelow.

Clipboard

Figure 13:
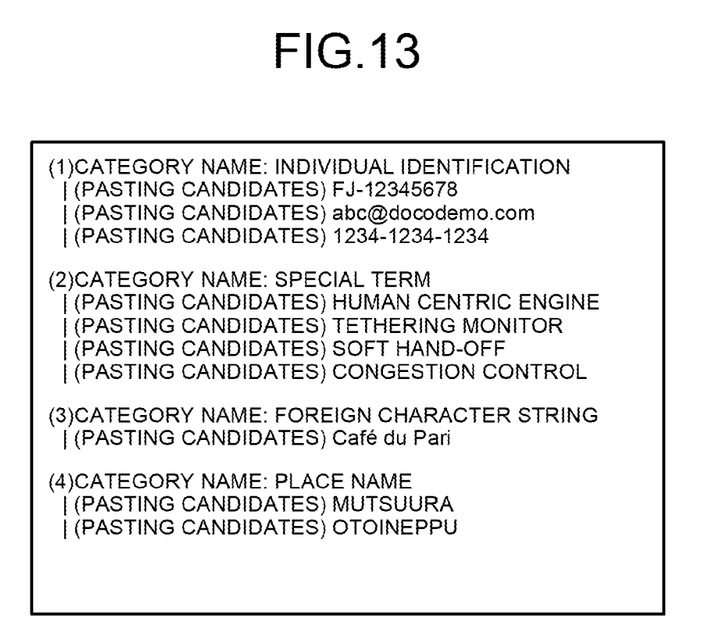
FIG. 13 illustrates an example of one clipboard divided into subregions.

In the first to fourth embodiments, there have been described the examples in which each category has a clipboard, i.e., the examples in which the memory has regions divided by category. However, the present invention is not limited to this configuration. For example, the region of one clipboard may be divided by category. FIG. 13 illustrates an example of one clipboard divided into subregions.

As illustrated in FIG. 13, the mobile terminal device 10 divides one clipboard into (1) category name: individual identification, (2) category name: special term, (3) category name: foreign character string, and (4) category name: place name. Upon detection of copy operation, the mobile terminal device 10 displays each category icon, and stores a copy in a selected category region. For example, when the "place name" icon is selected as a storage location of a character string "Tokyo," the mobile terminal device 10 registers "pasting candidate: Tokyo" next to "pasting candidate: Otoineppu" in (4) category name: place name illustrated in FIG. 13.

Thus, in the mobile terminal device 10, one clipboard may be shared by the respective categories instead of a plurality of clipboards being prepared. As a result, reduced memory usage can be expected.

Moreover, although the modes in which regions of respective categories are prepared in the memory have been disclosed in each of the aforementioned embodiments, the present invention is not limited thereto. For example, a mode can be considered in which a character string or the like is stored in an arbitrary free region of the memory while being association with a specified category. This makes it possible to dispense with the regions reserved for respective categories in the memory, and to thereby prevent undesirable occupancy of memory regions.

Highlighting

In the second and third embodiments, there have been described the examples in which the mobile terminal device 10 selects a category based on the character string that is a copy target and displays the icon of the selected category. However, the present invention is not limited thereto. For example, when copy operation is detected, the mobile terminal device 10 may display the respective category icons, while highlighting the icon of a category selected based on the character string that is a copy target. Examples of highlighting include changing the color of the icon, increasing the size of the icon, and displaying the icon at the center of the screen.

System

Furthermore, among the respective processings described in the present embodiment, all or part of the processings which have been described to be performed automatically may be performed manually. Or alternatively, all or part of the processings which have been described to be performed manually may be performed automatically by publicly known methods. In addition, the processing procedures, control procedures, specific names, and information including various kinds of data and parameters which have been disclosed in the above description and in the drawings may arbitrarily be changed unless otherwise specified.

Furthermore, the components of each unit illustrated in the drawings are only for conceptually illustrating the functions thereof and are not always physically configured as illustrated in the drawings. In other words, a concrete distribution and/or dispersion form of each device is not limited to those illustrated in the drawings. In short, each device may be configured by functionally or physically distributing and dispersing the whole or part of each device in arbitrary units depending on various kinds of loads, use conditions, and the like. Further, the whole or arbitrary part of the respective processing functions performed in each device may be implemented by a CPU or by programs that are analyzed and executed by the CPU, or may be implemented as wired-logic-based hardware. For example, the mobile terminal device 10 can execute the same functions as each of the above-described embodiments by expanding a copy control program in the memory and executing a copy controlling process.

According to the embodiments of the present invention, it becomes possible to improve the operability at the time of storing a copied or cut character string or the like.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus, comprising:
   a non-transitory memory; and
   a processor that is connected to the non-transitory memory, wherein the processor executes one operation from a group including a copy operation or a cut operation with respect to display information which is displayed on a predetermined display unit within a process including:
      displaying an icon in a category associated with the display information and specifying a storage area of the non-transitory memory on the predetermined display unit, upon reception of the one operation with respect to the display information; and
      storing the display information which is subjected to the one operation in the storage area of the non-transitory memory associated with the icon when the icon exists in a flicked direction in which the display information has been flicked and discarding the display information when the icon does not exist in the flicked direction.

2. The electronic apparatus according to claim 1, wherein the displaying includes displaying on the predetermined display unit an icon in a category corresponding to a type of the display information which is subjected to the one operation.

3. The electronic apparatus according to claim 1, wherein the displaying includes displaying on the predetermined display unit an icon in a category associated with the storage area storing information identical to the display information which is subjected to the one operation.

4. The electronic apparatus according to claim 1, wherein the predetermined display unit is a touch panel.

5. The electronic apparatus according to claim 1, wherein upon reception of paste operation, the process further comprises displaying respective icons in respective categories on the predetermined display unit, displaying on the predetermined display unit copied information or cut information associated with an icon in a category selected out of the displayed categories, and pasting information which is selected out of the displayed information, at a specified position.

6. A non-transitory computer-readable recording medium having stored therein a copy control program causing a computer to execute one operation from a group including a copy operation or a cut operation with respect to display information which is displayed on a predetermined display unit within a process comprising:

displaying an icon in a category associated with the display information and specifying a storage area of a non-transitory memory on the predetermined display unit, upon reception of the one operation with respect to the display information; and storing the display information which is subjected to the one operation in the storage area of the non-transitory memory when the icon exists in a flicked direction in which the display information has been flicked and discarding the display information when the icon does not exist in the flicked direction.

* * * * *